Patented Mar. 28, 1939

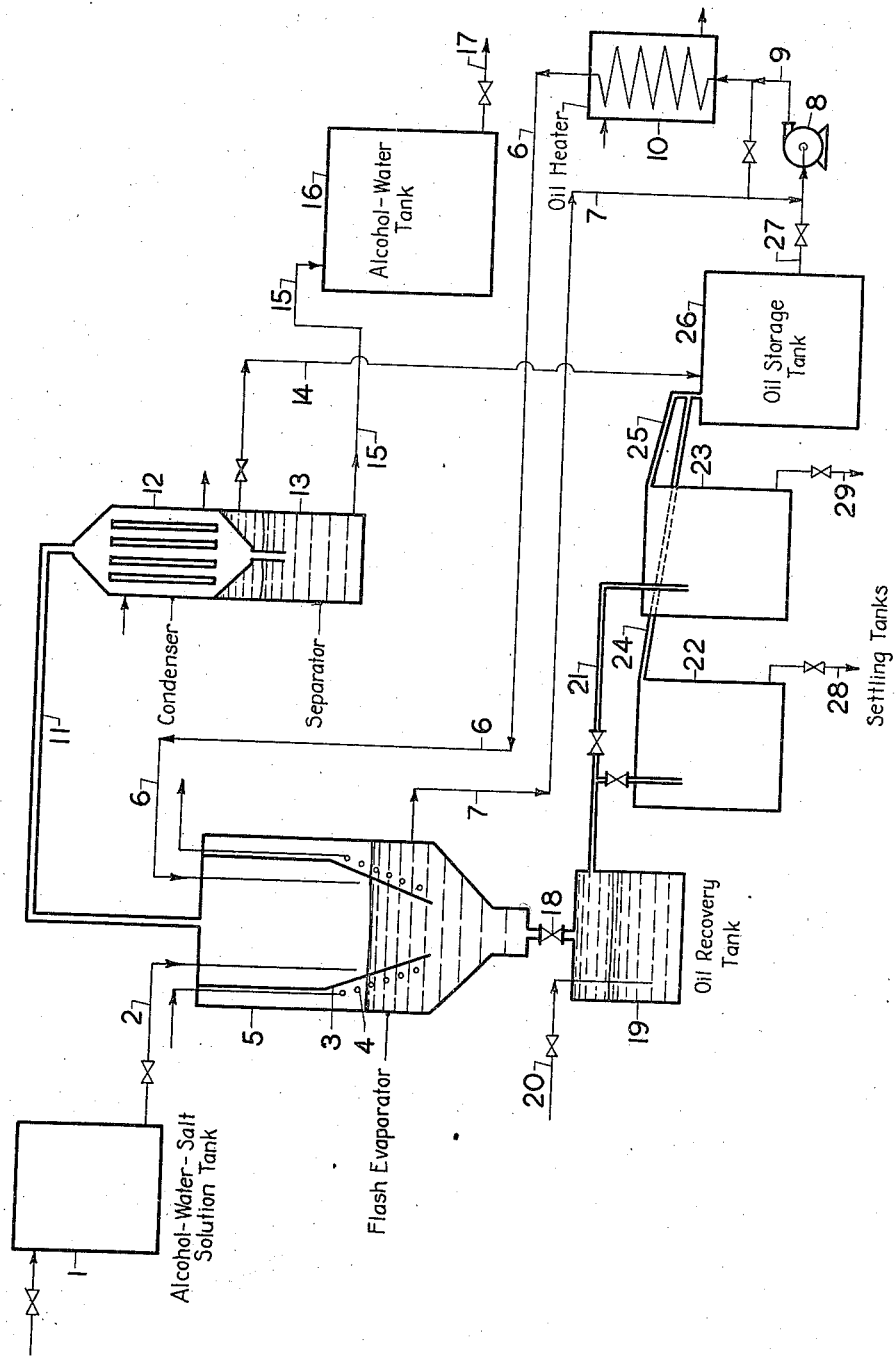

2,151,990

UNITED STATES PATENT OFFICE 2,151,990

RECOVERY OF ORGANIC COMPOUNDS

Jan D. Ruys, Pittsburg, Calif., assignor to Shell Development Company, San Francisco, Calif., a corporation of Delaware Application February 19, 1938, Serial No. 191,417

7 Claims. (Cl. 202—74)

This invention relates to a process for the recovery of volatile organic compounds and/or normally solid and involatile materials from mixtures comprising both such components.

While it is broadly applicable to the recovery of a volatile organic compound and/or a substantially non-volatile solid from a liquid system comprising these different components, the invention is of particular value in that it provides a practical and economical process, which may be operated in a batch, intermittent or continuous manner, for effecting the recovery of a vaporizable organic compound from a solution consisting of said organic compound and a dissolved substantially non-volatile solid organic or inorganic material, or for effecting the removal of a vaporizable organic compound from a solution comprising the organic compound, a dissolved substantially non-volatile solid inorganic material and one or more other volatile organic or inorganic liquids.

The process of the invention comprises contacting the solid-containing mixture with a liquid which is heated to a temperature sufficiently high to flash off the volatile organic compound, alone or together with any other volatile liquid which may be present in the treated solution, and leave the solid material dissolved or suspended in the heated liquid. In a generally preferred mode of operation, the heated liquid with which the solid-containing solution is contacted is substantially immiscible with the organic liquid to be flashed off and is a liquid in which the solid material of the treated solution is substantially insoluble. Thus, on contact of the solid-containing solution with the heated liquid, which liquid is heated to a temperature greater than the boiling temperature of the organic liquid to be recovered under the pressure existing in the system, the organic liquid is flashed off, while the solid material stays behind, for example, as a suspension, in the heated liquid from which it may be easily recovered. The flashed off organic compound is condensed and obtained free of the solid material.

The process of the invention is particularly adapted to the recovery of organic oxy-compounds such as monohydric alcohols, polyhydric alcohols, ethers, esters, aldehydes, ketones, olefine oxides, halohydrins, glycidols and the like from their aqueous solutions containing one or a plurality of dissolved salts. Many of such organic oxy-compounds, particularly the polyhydric alcohols, the olefine oxides and the halohydrins, may be prepared in commercial quantities, in accordance with known processes, by subjecting the corresponding hydrolyzable halogenated organic compounds such as the olefine dihalides, olefine halohydrins, glycerine halohydrins and the like to a hydrolysis treatment with water in the presence of a basic neutralizing agent. The basic agent which is usually a basic metal hydroxide or a basic metal salt reacts with the hydrogen halide liberated during the course of the hydrolysis reaction to neutralize all or a part of the same and form a metal salt which dissolves in the aqueous reaction mixture along with at least a part of organic reaction product. Thus, the reaction results in an aqueous solution of the organic reaction product and a salt. Recovery of the organic reaction product in a substantially pure and anhydrous form necessitates, as the first step, the separation of the organic product or the organic product and water, as well as any of the unreacted halogenated organic compound which may be present, from the salt.

There are several known methods for effecting the separation of polyhydric alcohols from their aqueous salt solutions, none of which are, from a technical standpoint, entirely satisfactory. The known methods in their simplest form comprise evaporating or distilling the water-polyhydric alcohol-salt mixtures. Since the polyhydric alcohols are relatively high boiling and boil at temperatures greater than 100° C., and since they do not in the great majority of cases form minimum constant boiling mixtures with water, the effect of the distillation and evaporation methods of the art is to concentrate the water-polyhydric alcohol-salt solutions by removing water therefrom, leaving the polyhydric alcohol and the salt behind. As the water is removed, the ratio of salt to water increases until eventually the salt begins to crystallize out. The presence of the solid salt in the mixture being distilled causes bumping and makes it extremely difficult to operate without carrying over polyhydric alcohol and increasing the losses. This makes it necessary to provide the still with so-called salt baskets into which the salt settles during the operation, or to periodically discontinue the operation and separate the salt from the mixture in the still-kettle by filtration or centrifugation. In any case, the removed salt retains a considerable amount of the polyhydric alcohol which must be recovered therefrom to avoid excessive losses. The polyhydric alcohol is customarily recovered from the salt by washing it with water and returning the wash water to the recovery system. This washing requires the reintroduction into the system of a considerable amount of water which must again be evaporated, besides reintroducing into the system a considerable amount of salt which was redissolved during the washing operation. It is seen that in such a recovery system the equipment must of necessity be of considerably greater capacity than would be required if the salt could be removed directly and substantially free of the polyhydric alcohol in a single stage distillation operation.

My invention provides a practical and economical process which can be operated continuously on a technical scale for the direct recovery of polyhydric alcohols and like compounds such as the glycidols, halohydrins, olefine oxides, etc., from aqueous salt solutions containing one or more of them. The polyhydric alcohol or like compound is substantially completely separated from the salt in a single operation, rendering subsequent treatment of the salt to recover any polyhydric alcohol or like compound retained therewith unnecessary.

In accordance with this embodiment of the invention, which will for purposes of illustration be described with particular reference to the recovery of a polyhydric alcohol from an aqueous salt solution containing the same, the polyhydric alcohol-water-salt solution is brought into contact with a stream or body of a heated liquid. This may be accomplished in a variety of suitable manners, for example, by continuously spraying the polyhydric alcohol-water-salt solution into a stream or body of the heated liquid contained in a suitable apparatus for the purpose.

The heated liquid with which the polyhydric alcohol-water-salt solution is contacted is, for this particular embodiment of the invention, one of relatively high boiling temperature which is preferably substantially immiscible with the polyhydric alcohol and water and in which the salt or salts to be separated from the treated solution are substantially insoluble. The liquid used should also be relatively stable and substantially incapable of reacting with the polyhydric alcohol and/or water under the conditions of operation. Suitable liquids for the purpose are the sufficiently high boiling hydrocarbons, hydrocarbon mixtures, halogenated hydrocarbons and the like. A suitable liquid will in most cases have an atmospheric boiling temperature greater than about 150° C. The high boiling oils such as refined Diesel oil, spray oil, light spindle oil and the like are particularly suitable; they are substantially immiscible with the polyhydric alcohols and water, and the salts encountered in the polyhydric alcohol-water-salt solutions are practically insoluble in them.

The heated liquid with which the aqueous polyhydric alcohol-salt solution is contacted is maintained at such a temperature that when the solution is contacted therewith at an appropriate rate, depending upon the capacity of the equipment and the conditions under which it is desired to operate, the polyhydric alcohol and water are rapidly and substantially completely flashed off. Thus, it is seen that the heated liquid should be at a temperature greater than the boiling temperature of the polyhydric alcohol and water under the pressure existing in the system. For example, when the process is executed to recover ethylene glycol from an aqueous solution containing ethylene glycol and a salt, and such solution is contacted with a heated oil whereby the ethylene glycol and water are flashed off leaving the salt in the oil, the oil is maintained at a temperature of from about 150° C. to 250° C. It is seen that since neither the polyhydric alcohol nor the water are miscible to any appreciable extent with the mineral oil, these two compounds will be completely vaporized and flashed off provided sufficient heat is available in the oil.

The salt present in the aqueous polyhydric alcohol-salt solution will, on contact of the solution with the heated liquid whereby the polyhydric alcohol and water are flashed off, remain in suspension in the heated liquid which under proper operating conditions will be substantially free of both polyhydric alcohol and water. The salt is very easily removed from the heated liquid in a variety of suitable manners such as by decantation, filtration, centrifugation, washing out, etc. For example, the salt can be filtered from the liquid and any liquid retained on it can be recovered by dissolving the salt and separating the immiscible liquid. If the salt is a waste product as may be the case when the salt is sodium chloride, operation in this manner provides a convenient mode of disposing of the salt. If desired, for example, when the salt is more valuable than sodium chloride, it may, of course, be recovered from the aqueous solution in any desired manner.

The vapors of the flashed off water and polyhydric alcohol may be condensed and the condensate further treated for the separation of the water and the polyhydric alcohol. Since the condensate is free of salt and consists of substantially only the polyhydric alcohol and water, the removal of water to obtain the polyhydric alcohol in an anhydrous or substantially water-free condition is easily accomplished by a variety of known methods. The usual distillation methods under atmospheric or subatmospheric pressure may be employed. In some cases, during the flashing off operation, a small amount of the flash evaporation medium may be carried over as vapors along with the vapors of the polyhydric alcohol and water, but after condensation it can be easily separated from the condensate and reutilized.

The process may be executed under any desired pressure. In many cases, excellent results may be obtained by operation with the flash evaporation system under about atmospheric pressure. In other cases, particularly when the organic compound is relatively high boiling, it may be desirable to effect the flashing operation under a reduced pressure, in which case the liquid flash evaporation medium need not be heated to such a high temperature to effect the flashing off.

The process is conveniently effected in a continuous manner by continuously feeding the polyhydric alcohol-water-salt solution at the desired rate into a flash evaporation apparatus of any convenient capacity, material and design wherein it is brought into contact with the liquid flash evaporation medium which has been heated to the desired temperature prior to its introduction into the evaporator. The liquid flash evaporation medium may be continuously circulated through a closed circuit comprising a heater wherein the circulating liquid is heated to the desired temperature, an evaporator wherein the circulating liquid leaving the heater is contacted with the polyhydric alcohol-water-salt solution, and a suitable circulating pump. The evaporator may be so designed that the salt, which is left behind in the circulating liquid as the polyhydric alcohol and water are continuously flashed off, discharged from the evaporator and condensed, settles out of the circulating liquid in the evaporator. This salt may be continuously or intermittently discharged from the evaporator and washed with water to recover any of the liquid flash evaporation medium therefrom. The recovered liquid may be recovered from the salt solution and continuously or intermittently returned to the cycle.

The drawing illustrates diagrammatically an assembly of apparatus in which the process of the invention may be executed continuously. The assembly illustrated on the drawing is particularly well adapted to the recovery of a polyhydric alcohol such as a glycol, glycerol, etc., from its aqueous solution with a salt, said solution being contacted with a circulating oil heated to such a temperature that the polyhydric alcohol and water are flashed off, leaving the salt suspended in the oil.

Referring to the drawing, reference Figure 1 designates a supply tank or container for the polyhydric alcohol-water-salt solution to be treated. Tank 1 is provided with a suitable inlet for admission of the solution from any source, for example, a hydrolyzer (not shown). The solution is fed from tank 1 at the desired rate through valved conduit 2 into flash evaporator 5 wherein it comes into contact with a heated body of oil introduced into the flash evaporator continuously through conduit 6.

The flash evaporator 5 may be of any suitable material and type. The evaporator shown on the drawing is of special design adapted to use with a minimum of foaming and so designed as to permit continuous settling and removal of salt therefrom. The polyhydric alcohol-water-salt solution and the heated oil come into contact in the conical portion of element 3. The conical part of element 3 is open at the apex and partly submerged in the circulating oil. The conical portion of element 3 is preferably surrounded, as shown on the drawing, by a suitable heating coil 4 through which any suitable heating medium such as steam, heated oil, etc., may be passed. The use of such auxiliary heating means may serve to reduce the amount of oil to be circulated through the oil circuit. By a proper regulation of the solution feed the foam formed on contact of the solution with the heated oil can be kept inside the portion of the cone which extends above the oil level in the evaporator. The lower part of the evaporator illustrated is cone shaped and provided at the lower portion thereof with a valved conduit provided with a valve or plug-cock through which settled salt may be intermittently or continuously discharged from the evaporator. The oil containing suspended salt passes downward through the restricted part of the cone of element 3 into the lower portion of the evaporator where the salt settles out in the conical bottom thereof. The clear oil passes upward on the outside of inner cone 3, and is discharged from evaporator 5 through conduit 7. Evaporator 5 may be provided with suitable sight-glasses (not shown) so that the oil level in the evaporator can be seen and kept substantially constant during the operation.

The oil leaves evaporator 5 through conduit 7, passes into the suction side of circulating pump 8, and is pumped through conduit 9 into oil heater 10. Oil heater 10 may be of any type of heater adapted to supply heat to and raise the oil passed therethrough to the desired temperature. The heater may be of the type shown wherein heating is supplied to the oil passing through the coils by indirect heat transfer from a heated fluid such as steam or oil, or the heater may be of the furnace type and heated by gas or electrically.

From heater 10, the heated oil is passed through conduit 6 into evaporator 5, completing the circuit. The oil circuit may be equipped with a by-pass line between conduits 7 and 9 near pump 8 to permit accurate regulation of the flow of oil through the circuit.

The flashed off vapors of the polyhydric alcohol and water leave evaporator 5 continuously through conduit 11 and pass into condenser 12 wherein they are condensed along with any oil vapors which might have been carried over with them. Condenser 12 may be of any suitable type. The condenser shown is of the jacketed tube type, cooling being effected by circulating a suitable cooling medium such as water through the jacket surrounding the tubes into which the vapors are passed. The condensate passes from the lower portion of condenser 12 into separator 13. On the drawing, condenser 12 and separator 13 are shown as a unit of special design adapted to permit easy separation and return to the oil circulating system any oil carried over with the polyhydric alcohol-water vapors. The oil, in case any is present, may be continuously or intermittently drained from the surface of the polyhydric alcohol-water solution in separator 13 and passed through valved conduit 14 into oil storage tank 26. Condenser 12 and separator 13 may, if desired, be separate units, and they may be of any suitable material and type. It is desirable that separator 13 be equipped with a suitable sight-glass (not shown) so that the oil level therein may be easily seen and the rate of the discharge of the oil layer therefrom regulated. The polyhydric alcohol-water solution is conducted from the lower portion of separator 13 through conduit 15 into storage tank 16. The aqueous salt-free polyhydric alcohol solution may be conducted from tank 16 through conduit 17 to one or more recovery stages (not shown) wherein it is treated, for example, by distillation under reduced pressure, to separate water and obtain the polyhydric alcohol in an anhydrous or substantially anhydrous condition.

The salt which is discharged from evaporator 5 through valve 18 into oil recovery tank 19 may carry considerable oil with it, the oil being adherent to the salt crystals. This oil is recovered and returned to the hot oil circuit by means of the oil recovery system which comprises oil recovery tank 19, settling tanks 22 and 23, and oil storage tank 26. The salt is dissolved in tank 19 by water introduced into the bottom portion of the tank through conduit 20 to provide mixing. Tank 19 may, if desired, be provided with additional stirring or agitating means to insure mixing and complete dissolving of the salt. Water may be admitted to tank 19 continuously or intermittently. The salt solution and oil passes from the upper portion of tank 19 into conduit 21 from which it is discharged into settling or stratification tanks 22 and 23. In tanks 22 and 23, stratification occurs and the upper or oil layer is discharged therefrom into oil storage tank 26. The settling tanks may be operated in the following manner: Tank 22 is filled with the salt solution-oil mixture, and the mixture therein allowed to stratify. While the mixture in tank 22 is stratifying, the liquid salt solution-oil mixture from tank 19 is run into tank 23. After stratification has occurred, sufficient liquid is run into tank 22 from conduit 21 to float the oil layer through conduit 24 into oil storage tank 26. Settling tank 23 may be used in like manner while the liquid from tank 19 is being run into settling tank 22. The oil layer is conducted from tank 23 into oil storage tank 26 through conduit 25. Tanks 22 and 23 are provided with outlet conduits 28 and 29, respectively, through which the salt solution, after separation of the oil therefrom, is discharged from the system. The oil from oil storage tank 26 may be returned to the oil circuit through valved conduit 27 which discharges into conduit 7.

Valves, pumps, temperature indicating means, pressure indicating means, heaters, coolers, etc., may be used in the illustrated system wherever deemed necessary or desirable.

The following table gives the data of two typical runs made in accordance with the process of the invention employing an apparatus similar to that shown on the drawing. Ethylene glycol and water were flashed from a glycol-water-salt solution by contacting said solution with a heated oil.

|  | Run 1 | Run 2 |
| --- | --- | --- |
| Glycol concentration of soln. treated (gm/liter) | 68.61 | 65.34 |
| Salt concentration of soln. treated (gm/liter) | 161.9 | 153.2 |
| Volume glycol-water-NaCl soln. treated (liters) | 3,087 | 2,791 |
| Operating time (hours) | 144.5 | 155.0 |
| Feed rate of soln. treated (liters/hour) | 21.4 | 18.0 |
| Oil temperature at inlet to evaporator (°C.) | 178 | 173 |
| Oil temperature at bottom of evaporator (°C.) | 164 | 163 |
| Temperature glycol-water vapors (°C.) | 122 | 121 |
| Glycol recovered (kilograms) | 202.9 | 174.8 |
| Glycol recovered (percent) | 95.8 | 95.8 |

In like manner, other polyhydric alcohols such as propylene glycol, the butylene glycols, the amylene glycols, glycerol, alpha-methyl glycerol, beta-methyl glycerol and the like as well as their homologues, analogues and suitable substitution products may be recovered from their aqueous solutions containing one or more salts. The process is also applicable with good results to the recovery of the polyhydric alcohol derivatives such as the olefine oxides (ethylene oxide, propylene oxide, etc.), the glycidols (glycidol, alpha-methyl glycidol, beta-methyl glycidol, etc.), the halohydrins (ethylene chlorhydrin, propylene chlorhydrin, glycerin monochlorhydrin, glycerin dichlorhydrin, etc.), and the like from their aqueous solutions containing one or more salts.

While I have described my invention in a detailed manner and illustrated suitable modes of executing the process thereof, it is to be understood that modifications may be made and that no limitations other than those imposed by the scope of the appended claims are intended.

I claim as my invention:

1. In a continuous flash distillation process for the recovery of ethylene glycol from an aqueous solution containing ethylene glycol and a dissolved salt, the steps which comprise continuously bringing the aqueous glycol-salt solution into contact with a circulating body of oil which is substantially immiscible with ethylene glycol and boils under the existing pressure at a temperature above that at which said flash distillation is effected and maintained at a temperature of from about 150° C. to about 250° C. at such a rate that the ethylene glycol and water are continuously and substantially completely flashed off without substantial ethylene glycol decomposition, leaving the salt in the oil, withdrawing oil containing salt, separating salt from the withdrawn oil and heating and recycling the separated oil to the flash distillation stage.

2. In a flash distillation process for the recovery of ethylene glycol from an aqueous solution containing ethylene glycol and a dissolved salt, the steps which comprise contacting the aqueous glycol-salt solution with a body of a liquid boiling under the existing pressure at a temperature above that at which said flash distillation is effected and, which is substantially immiscible with ethylene glycol and water and in which salts are substantially insoluble, said liquid being maintained at a temperature sufficiently high to substantially completely flash off the ethylene glycol and water but below that at which substantial decomposition of said glycol takes place, leaving the salt in the heated liquid, withdrawing salt containing liquid, separating salt therefrom and recycling the liquid to the flash distillation stage.

3. In a flash distillation process for the recovery of a glycol from an aqueous solution containing a glycol and a dissolved salt, the steps which comprise contacting the glycol-water-salt solution with a body of oil which is substantially immiscible with and boils at a higher temperature than said glycol and in which said salt is substantially insoluble and maintained at a temperature sufficiently high to substantially completely flash off the glycol and water but below that at which substantial decomposition of said glycol takes place, leaving the salt in the oil, withdrawing oil containing salt, separating salt from the withdrawn oil and heating and recycling the separated oil to the flash distillation stage.

4. In a flash distillation process for the recovery of a glycol from an aqueous solution containing a glycol and a dissolved salt, the steps which comprise contacting the glycol-water-salt solution with a body of a liquid boiling under the existing pressure at a temperature above that at which said flash distillation is effected and which is substantially immiscible with the glycol and the water, said liquid being maintained at a temperature sufficiently high to substantially completely flash off the glycol and the water but below that at which substantial decomposition of said glycol takes place, leaving the salt in the heated liquid, removing salt from said liquid and contacting the liquid with more glycol-water-salt solution.

5. In a flash distillation process for the recovery of a polyhydric alcohol from an aqueous solution containing a polyhydric alcohol and a dissolved salt, the steps which comprise contacting the polyhydric alcohol-water-salt solution with a liquid boiling under the existing pressure at a temperature above that at which said flash distillation is effected and which is substantially immiscible with the polyhydric alcohol and water and in which said salt is substantially insoluble, said liquid being maintained at a temperature sufficiently high to substantially completely flash off the polyhydric alcohol but below that at which substantial decomposition of said alcohol takes place, leaving the salt in admixture with the heated liquid, removing salt from said liquid and further contacting the liquid with polyhydric alcohol-water-salt solution.

6. In a flash distillation process for the recovery of an alcohol from an aqueous solution containing an alcohol and a dissolved salt, the steps which comprise contacting the aqueous alcohol-salt solution with a liquid boiling under the existing pressure at a temperature above that at which said flash distillation is effected and which is substantially immiscible with the alcohol and water and in which salts are substantially insoluble, said liquid being maintained at a temperature sufficiently high to substantially completely flash off the alcohol and water but below that at which decomposition of said alcohol is substantial during said flash distillation, separating salt from said liquid and further contacting the liquid with said aqueous alcohol-salt solution.

7. A continuous process for the recovery of a polyhydric alcohol from an aqueous solution containing a polyhydric alcohol and a dissolved salt which comprises continuously feeding the aqueous alcohol-salt solution into a flash distillation stage wherein it is brought into contact with a circulating body of oil which is substantially immiscible with and boils at a higher temperature than said alcohol and in which said salt is substantially immiscible and maintained at a temperature sufficiently high to substantially completely flash off the polyhydric alcohol and water and leave the salt in suspension in the oil but below that at which substantial decomposition of said alcohol takes place, continuously removing the flashed off polyhydric alcohol and water vapors from the system withdrawing oil containing said suspended salt, separating the salt from the oil, and heating and recycling the separated oil to the flash distillation stage.

JAN D. RUYS.